United States Patent Office 3,505,275
Patented Apr. 7, 1970

3,505,275
PROCESS FOR PRODUCING NON-FOAMING
URETHANE-TYPE POLYMERS
Hisayuki Sato, Matsudo-shi, Mitsuo Koga, Tokyo, Takeo
Aoki and Kazunari Hayashida, Yokohama, and Ikuhiro
Kohno, Chiba-ken, Japan, assignors to Hodogaya Chemical Co., Ltd., Tokyo, Japan, a corporation of Japan
No Drawing. Filed Dec. 8, 1965, Ser. No. 512,526
Claims priority, application Japan, Dec. 10, 1964,
39/69,109; Feb. 10, 1965, 40/7,002
Int. Cl. C08g 22/04
U.S. Cl. 260—37   3 Claims

ABSTRACT OF THE DISCLOSURE

Non-foaming polyurethane substances useful in coating materials and as a binder or a sealant, are prepared by reacting an organic compound having at least two terminal isocyanate groups with a polyol having at least two active hydrogen atoms, so as to produce a polyurethane prepolymer and subsequently curing the prepolymer in admixture with (a) water, (b) an inorganic basic metal compound and (c) $CaCl_2 \cdot 2H_2O$. Preferred isocyanate compounds include 4,4'-diphenyl methane diisocyanate and tolylene diisocyanate and preferred polyols include castor oil and polyalkylene.

---

This invention relates to a process for producing foam-free polyurethane substances by reacting a compound having 2 or more terminal isocyanate groups with a compound having 2 or more active hydrogen atoms.

Conventionally, in preparing non-foaming polyurethane substances, the presence of water has been considered extremely objectionable. That is, in forming polyurethane resins by reacting and curing at a time a polyisocyanate in more or less excess of the theoretical amount with a compound having active hydrogen, e.g. hydroxyl polyester or hydroxal polyether, or in preparing polyurethane resins by cross-linking and curing the so-called polyurethane prepolymer containing free isocyanate groups, obtained by reaction of a polyisocyanate in excess of the theoretical amount and a compound having active hydrogen, with a compound having 2 or more active hydrogen atoms, e.g. an amine, glycol or polyol or water, the presence of water necessarily results in the generation of carbon dioxide during the reaction and hence has been a great obstacle in the production of other substances than foams. For example, a solution of said prepolymer cross-links and cures due to the moisture in the air and is used as a one-pack coating material. In this case, if the solution is low in concentration and in viscosity and is to be used to form a relatively thin film, the generated carbon dioxide easily escapes out of the film, whereby a foam-free, tough film can be finally obtained. However, as the concentration of the prepolymer is increased to produce a thicker film, the initial liquid layer is more viscous as well as thicker, with the result that the generated carbon dioxide escapes from the film less readily so that, in some cases, a foamed film is produced which is not satisfactory for the intended practical use. Particularly when the above composition is desired to be poured and filled in deep grooves, e.g. the damaged portions of roads or the joints of constructions and roads, the composition necessarily foams to overflow the grooves due to the moisture of materials and the air, and it was scarcely possible form tough or elastic layers in the poured portion.

In order to overcome the above drawbacks, there have been proposed processes using dehydrating agents, and the like, but no satisfactory commercial process has ever been found.

As a result of various studies on a simple and advantageous process for preventing the aforesaid isocyanate group-containing compounds from foaming during the reaction, the present inventors have found that in case the reaction is effected in the presence of suitable amounts of water or an inorganic substance containing water of crystallization and a hydroxide, oxide, basic salt, complex salt or double salt of a metal of Groups II, III and IV of the Periodic Table, not only a polyurethane substance is produced with marked ease but the reaction velocity is greatly accelerated.

It is therefore an object of the present invention to provide a process for producing non-foaming urethane type polymers which comprises reacting a compound having 2 or more terminal isocyanate group with an organic compound having 2 or more active hydrogen atoms, characterized by adding to the system (A) water and/or or an inorganic compound containing water of crystallization and (B) one or more basic metal compounds selected from the group consisting of hydroxides, oxides and silicates of metals of Groups II, III and IV of the Mendeleev's Periodic Table.

In the process of the present invention, the optimum range of the amount of water to be added in reacting the compounds having terminal isocyanate groups should be decided depending upon the content of isocyanate and the the kind and amount of the basic metal compound to be added in combination therewith. Generally, however, the range is considerably broad, and is preferably from 1 to 30 weight percent based on the weight of polymer. In case an inorganic compound containing water of crystallization is used in place of water, the effective water content thereof may be adjusted so as to be within the above-mentioned range. In the process of the present invention, therefore, water contained in other additives which are ordinarily employed in the production of polyurethane substances, e.g. aggregates such as sand, stone powder and ground stone, fillers such as calcium carbonate, asbestos and silica, and coloring materials such as pigments and the like, is not objectionable but is rather utilized effectively together with said water to be added, and no such troublesome pre-treatments as drying and the like of said additives are required.

In the process of the present invention, the basic metal compounds to be added together with water or the inorganic compound water of crystallization, to prevent foaming during reaction, i.e. hydroxides, oxides, and silicates of metals of Groups II, III and IV of the Mendeleev's Periodic Table, include basic metal hydroxides such as calcium hydroxide, barium hydroxide, magnesium hydroxide, cadmium hydroxide, lead hydroxide and basic lead acetate, and metal oxides convertible into said metal hydroxides in the presence of water such as, for example, calcium oxide, barium oxide, lead oxide, zinc oxide, magnesium oxide and aluminum oxide. In addition thereto, various cements such as, for example, Portland cement, alumina cement and hydraulic lime, and calcium silicate, barium silicate and the like can advantageously be employed as well. These basic metal compounds may be used effectively either alone or in admixture, and the amount thereof is preferably within the range of from 1 to 50 weight percent based on the weight of the polymer.

The compound having 2 or more terminal isocyanate groups which is to be used in the process of the present invention includes aliphatic diisocyanates, such as propylene diisocyanates and hexamethylene diisocyanate; aromatic diisocyanates such at tolylene-2,4-diisocyanate, tolylene-2,6 - diisocyanate, diphenylmethane-4,4'-diisocyanate, diphenylmethane-2,4-diisocyanate, 3-methyl diphenylmethane-4,4'-diisocyanate, m- and p-phenylene diisocyanate, chlorophenylene-2,4-diisocyanate, naphthylene-1,5-diisocyanate, naphthalene-1,4-diisocyanate, diphenyl-4,4'- diisocyanate, 4,4'-diisocyanate-3,3'-dimethyldiphenyl and diphenyl ether diisocyanate; alicyclic diisocyanates such as dicyclohexylmethane diisocyanate and methyl cyclohexyl diisocyanate; mixtures of these diisocyanates; and polyphenyl polyisocyanate mixtures containing said diisocyanates. In addition, the so-called urethane prepolymer obtained by the reaction of said isocyanates in excess of the theoretical amounts and the polyhydroxyl compounds shown below are also usable.

Further, the compound having 2 or more active hydrogen atoms which is to be used in the process of the present invention includes the following compounds:

(1) Caster oil and other glyceride esters of hydroxylated fatty acids. Castor oil is the preferred polyol. Related materials which are operative include hydrogenated castor oil, glycerine monoricinoleate, glycerine diricinoleate and the blown drying oils such as blown soya, tung, poppy seed, hemp seed or linseed oils, and partial esters of glycerine with blown drying oil fatty acids.

(2) Polyester-polyols prepared by copolymerizing low molecular weight polyols and polycarboxylic acids. These materials are prepared by reacting a mixture containing the polycarboxylic acids and polyols in proportions such that a stoichiometric excess of polyol is present to insure that the resulting polyester will have a preponderance of terminal hydroxyl groups over terminal carboxyl groups preferably the low molecular weight polyols are predominantly diols, e.g. mono-, di- or tri-ethylene or propylene glycols, 1,4-butanediol, diethanolamine, etc. Advantageously, a minor amount of a triol such as glycerine, hexane triol, trimethylol ethane or trimethylol propane may be included. Suitable acids include adipic, succinic, maleic, phthalic, terephthalic, etc.

(3) Polyalkylene glycols such as polyethylene glycols, polypropylene glycols or mixed polyethylene-polypropylene glycols.

(4) Isocyanate-modified polyols having 2 or more terminal hydroxyl groups which are obtained by reacting said isocyanates and said polyols in excess of the theoretical amounts.

(5) Polyhydric polythioether such as the condensation products of thiodiglycols, and the reaction products of polyhydric alchols and any thioether glycols.

(6) Amines such as ethylenediamine, propylenediamine, hexamethylenediamine, phenylenediamine, toluylenediamine, aminoethyl alcohol and ethanolamine, and water.

In practicing the process of the present invention, water and/or an inorganic compound containing water of crystallization and said basic metal compound may be added together with other additives, e.g. with a mixture prepared by kneading a polyhydroxyl compound having active hydrogen with an aggregate, a pigment, a filler and bitument. Alternatively, a mixture formed by kneading said basic metal compound with a natural or synthetic rubber latex which has already contained water may be added to the compound having isocyanate groups at the time of application or may be added together with said various additives.

In reacting the compound having terminal isocyanate groups, a small amount of a metal salt of an organic acid is further added to greatly improve the uniform miscibility and fluidity of the starting materials for resin as well as to improve the "wettability" of the additives such as pigment, filler, etc., and the amounts of said additives may be greatly increased to improve the mechanical strength of the resulting resin. Further, even in the case of kneading the active hydrogen-containing compound with the basic metal compound and water, the addition of said organic acid metal salt facilitates the kneading operation and the kneaded substance is improved not only in fluidity but also in storability since there occurs no separation of solid content from liquid content.

Such organic acid metal salts are salts obtained by the combination of various organic acids with metals, and particularly effective salts are the so-called metallic soaps which are used as polymerization catalysts or drying agents for synthetic resins. In the above, the organic acids to be used include, for example, naphthenic, octylic, tall-oil, linoleic, abietic, stearic, palmitic and myristic acids. The metals include, for example, copper, magnesium, calcium, cadmium, zinc, aluminum, tin, zirconium, lead, chromium, manganese, nickel, iron and cobalt. The organic acid metal salts include free combinations of said organic acid and metals, such as for example, lead naphthenate, zinc naphthenate, magnesium naphthenate, cobalt naphthenate, cadmium naphthenate, lead octoate, calcium octoate, iron octoate, aluminum octoate, calcium stearate, cadmium stearate, lead stearate, calcium salt of tall oil acid, zinc salt of tall oil acid, iron salt of tall oil acid and zinc linoleate.

In practice, the organic acid metal salt to be used should be selected according to the compositions of the isocyanate group-containing compound, active hydrogen-containing compound and basic metal compound employed. In this case, the selection is required to be made while taking into consideration not only the miscibility and fluidity of the starting materials for resin but the reaction promoting effect of the metal salt. That is, some of the organic acid metal salts act, depending on the kind of the metals employed, as catalysts for the urethane formation reaction, and there are some cases where even when the starting materials are improved in miscibility, the reaction velocity is accelerated to make the pot life markedly short, whereby the resulting resin cannot be put into practical use. The optimum amount of the organic acid metal salt varies depending on the kind of salt and composition of resin and cannot be limited to a definite range. Generally, however, the amount is less than several percent, preferably within the range of from 0.001 to 5 weight percent, based on the weight of polymer.

Further, in practicing the process of the present invention, it is also possible to add as a reaction inhibitor, in order to maintain the reaction velocity suitably, an inorganic metal halide such as sodium chloride, sodium bromide, magnesium chloride, calcium chloride, barium chloride, aluminum chloride, aluminum bromide, tin chloride or zinc chloride; an inorganic metal nitrate such as calcium nitrate or aluminum nitrate. The mixtures obtained in the above manners can be applied to various uses by spray coating, brush coating or knife coating or according to injection process using a caulking gun.

In accordance with the process of the present invention, even when the isocyanate group-containing compounds incorporated with no or small amount of solvent are formed into any thick layers and are cured, no expansion is seen in the layer, and thus it has become possible to utilize said substances for a wide scope of uses to which they have never been applied hitherto.

That is, the process of the present invention is not only applicable to the conventionally known uses of polyurethane resins, e.g. coating materials, binders, fillers and the like, but is quite advantageously applicable to uses to which the resins have never been applied due to the formation of foams, e.g. mortar for walls and floors, materials for repairing the damaged portions of roads and base materials for the construction of public works and roads.

Further, in accordance with the process of the present invention, there is obtained such advantage that, by virtue of the addition of suitable amounts of water and/or an inorganic compound containing water of crystallization and the aforesaid basic metal compound, the reaction of the isocyanate group-containing compound is greatly accelerated and, moreover, the reaction progresses also from the interior of layer, whereby a homogeneous cured layer is formed in a short period of time.

The process of the present invention will be illustrated with reference to the following examples, in which all the parts are by weight unless otherwise defined:

EXAMPLE 1

A mixture comprising 350 parts of castor oil and 260 parts of 4,4′-diphenylmethane diisocyanate was reacted at 80°–110° C., with stirring, to obtain a prepolymer, and 100 parts of the prepolymer was thoroughly mixed with 200 parts of calcium hydroxide and 30 parts of water. The resulting paste was used to bond wood and concrete, whereby the paste cured in about 2 hours and showed a high bonding strength, and no foam was observed in the bonded layer. This composition is useful as a binder for glass, wood, metals and concrete.

EXAMPLE 2

90 parts of polymethylene polyphenyl isocyanate (NCO content: 33%) of the general formula $$H[C_6H_3(NCO)CH_2]_nC_6H_4NCO$$

wherein $n$ has an average value of more than 1.1, was reacted with 100 parts of castor oil to obtain a prepolymer. 100 parts of the prepolymer was thoroughly mixed in a mixer with 200 parts of cement, 20 parts of water and 300 parts of sand. The resulting paste was filled in a cracked portion of cement and allowed to stand overnight, whereby the paste completely cured and well bonded with the concrete and no increase in volume was observed at all. This process is suitable for preparing materials for repairing concrete constructions and binders for old and new concretes.

EXAMPLE 3

A reaction product obtained from 100 parts of polypropylene glycol (molecular weight: 1000), 13.2 parts of trimethylpropane and 70 parts of tolylene diisocyanate was dissolved in a mixed solvent of xylene and Cellosolve acetate (1:1), so that the solid content became 65%. 100 parts of the solution was kneaded with 37 parts of titanium dioxide, 25 parts of barium hydroxide and 3 parts of water. The resulting mixture was coated on asphalt, whereby the mixture quickly cured and dried to form a film of about 3 mm. in thickness in a dry state and no expansion due to foaming was observed at all. This process is preferable as a means for applying lanemark to pavement.

EXAMPLE 4

A prepolymer was obtained from 85 parts of diethyleneglycol-adipic acid polyester (molecular weight: 2000) and 17 parts of 4,4′-diphenylmethane diisocyanate. 15 parts of the prepolymer was mixed with a mixture prepared by kneading 10 parts of coal tar with 5 parts of asphalt, 5 parts of cadmium hydroxide and 2 parts of water to obtain a black paste. The composition was poured into and cured in a groove having a depth of 10 mm. and a width of 20 mm., whereby it did not expand at all in reacting to become an elastomer excellent in bonding strength. This composition is suitable as an asphalt coking material employed for joint materials of roads.

EXAMPLE 5

To 25 parts of the prepolymer of Example 2, a kneaded substance comprising 36 parts of coal tar, 15 parts of barite, 9 parts of calcium silicate, 2 parts of water and 15 parts of solvent was added to obtain a liquid substance. The liquid substance was applied onto the surface of a film, and the resulting film had no foam and was excellent in bonding strength and chemical resistance. The above liquid substance is preferable as an anti-rust coating material or the like.

EXAMPLE 6

A prepolymer obtained from 200 parts of tolylene diisocyanate, 247 parts of castor oil and 9 parts of glycerine was thoroughly mixed with 230 parts of magnesium oxide and 90 parts of disodium phosphate dodecahydrate ($12H_2O$). The resulting paste was filled in a crack of concrete and was allowed to stand overnight, whereby the paste completely cured and well bonded with the concrete, and no volume increase was observed at all. This process is suitable for preparing materials for repairing concrete constructions and binders for old and new concretes.

EXAMPLE 7

An addition product of 134 parts of trimethylol propane and 522 parts of tolylene diisocyanate was dissolved in ethyl acetate so that the solid content became 75%. 100 parts of the solution was mixed with 168 parts of polyester (OH content: 8.7) synthesized from adipic acid, pthalic acid and trimethylol propane and with a kneaded substance comprising 336 parts of a mixed solvent of ethyl acetate and methylethylketone (1:1) and 44 parts of barium hydroxide hexahydrate ($8H_2O$). The resulting composition was applied onto the surface of concrete so that the thickness of the resulting film became about 2 mm. The film obtained was tough, excellent in weather and water resistance and favorable in bonding strength, and no foam was observed therein at all. The above composition is preferable as a water proof coating material for concrete for constructions and dams.

EXAMPLE 8

215 parts of castor oil, 120 parts of titanium dioxide, 25 parts of talc, 30 parts of calcium silicate, 10 parts of water and 1.5 parts of calcium naphthenate were kneaded on a roller mill, and the kneaded substance was mixed with 85 parts of diphenylmethane diisocyanate. The mixture, in spite of its being markedly high in content of pigment and filler, had a sufficient fluidity, could be easily filled in cracked portions of concrete, completely cured in about 4 hours, was excellent in bonding strength and hardness and showed no volume increase at all. This mixture is suitable as repairing putty.

EXAMPLE 9

29 parts of polypropylene ether triol (molecular weight: 1500), 20 parts of calcium hydroxide, 9 parts of calcium chloride dihydrate ($2H_2O$) and 4.5 parts of water were kneaded on a roller mill to form a mixture. The mixture was thoroughly mixed with 37.5 parts of polymethylene polyphenyl isocyanate (NCO content: 33%) of the general formula $$H[C_6H_3(NCO)CH_2]_nC_6H_4NCO$$

wherein $n$ has an average value of more than 1.1. The mixture was applied onto the surfaces of metals and wood to a thickness of 1–3 mm., whereby the mixture completely cured in about 3 hours to give easily polishable coatings. This non-solvent type coating material is particularly excellent as an undercoating for every coating material.

EXAMPLE 10

23 parts of a polyol obtained by modifying 20 parts of castor oil with 3 parts of tolylene diisocyanate was mixed with 10 parts of castor oil, 26 parts of magnesium hydroxide, 2.7 parts of calcium chloride dihydrate ($2H_2O$), 0.6 part of lead naphthenate and 2.7 parts of water, and the mixture was kneaded on a roller mill to form a paste. To the paste were added 35 parts of the polymethylene polyphenyl isocyanate employed in Example 9 and 300 parts of sand, and mixture was thoroughly stirred in a mixer to obtain resin mortar. Cured products of the resin mortar are particularly excellent in impact and abrasion resistance and are used as expansion joints for bridges.

What we claim is:

1. A process for producing non-foaming urethane type polymers which comprises reacting an organic compound having at least two terminal isocyanate groups with a mixture comprising (a) a polyol having at least two active hydrogen atoms, (b) water, (c) magnesium hydroxide or calcium hydroxide and (d) $CaCl_2 \cdot 2H_2O$, the amount of said water being in the range of 1 to 30% by weight based on the weight of said polymer and the amount of said (c) component being in the range of 1 to 50% by weight based on the weight of said polymer.

2. A process according to claim 1, wherein the (d) component is present in the range of 4 to 13.5% by weight of the polymer.

3. A process according to claim 1, wherein the mixture comprising the (a), (b), (c) and (d) components further contains (e) lead naphthenate.

References Cited

UNITED STATES PATENTS

| | | |
|---|---|---|
| 3,272,098 | 9/1966 | Buchholtz et al. |
| 3,267,047 | 8/1966 | Gmitter et al. |
| 3,240,736 | 3/1966 | Beckwith _____ 260—29.2 |
| 3,196,026 | 7/1965 | Menard et al. |
| 3,073,802 | 1/1963 | Windemuth. |
| 2,929,800 | 3/1960 | Hill _____ 260—77.5 |
| 2,867,278 | 1/1959 | Mallory. |
| 2,650,212 | 8/1953 | Windemuth _____ 260—2.5 X |

FOREIGN PATENTS 719,787  12/1954  Great Britain.

HOSEA E. TAYLOR, JR., Primary Examiner

C. WARREN IVY, Assistant Examiner

U.S. Cl. X.R.

260—77.5, 18, 75, 29.2, 28; 156—331; 117—123, 132, 148